Patented June 15, 1948

2,443,212

UNITED STATES PATENT OFFICE 2,443,212

WRINKLE FINISH

William Allshire Waldie, Oakwood, Ohio, assignor to New Wrinkle, Inc., Wilmington, Del., a corporation of Delaware No Drawing. Application December 6, 1944, Serial No. 566,959

14 Claims. (Cl. 106—225)

This invention relates to wrinkle finish coating compositions and the method of producing the same. More particularly this invention deals with compositions made from hydrocarbon materials such as gilsonite and pitch.

Those skilled in the art of wrinkle finishes heretofore were of the opinion that gilsonite and similar hydrocarbon substances were not usable in their formulas for wrinkle coating materials and hydrocarbon materials of that nature inhibited the development of a wrinkled structure. This prejudice against the use of gilsonite and pitch has been overcome by the present invention according to which wrinkle finishes may be produced from gilsonite or pitch or a mixture of both.

It is thus an object of this invention to produce wrinkle finishes and wrinkle finish compositions from materials which are relatively inexpensive and available from domestic sources.

It is another object of this invention to produce colored wrinkle finishes which do not require the addition of pigments.

Other and further objects and advantages will appear from the more detailed description set forth below, it being understood, however, that this more detailed description is given by way of illustration only and not by way of limitation since various changes in this disclosure may be made by those skilled in the art without departing from the scope and spirit of this invention.

In the production of wrinkle coatings in accordance with the present invention, hydrocarbon materials are used, such as gilsonite or pitch, together with the usual oil, solvent and thinner. If desired, the hydrocarbon substances may be employed in admixture with resins; however, hydrocarbon materials alone will give entirely satisfactory results.

Apart from the simplicity of composition the wrinkle coatings obtained by the process of this invention have the advantage of exhibiting a color ranging from golden yellow to a very dark brown and black without any addition of pigments. The shade and intensity of color can be controlled by selecting the right hydrocarbon materials or mixing them in the proper proportions, candle pitch yielding the lightest shade, namely a delicate gold tone, gilsonite the darkest, namely a very dark, blackish brown and stearine pitch producing a coating the hue of which is in between these two aforementioned shades.

Any resin usable for the production of varnishes may be used for the process of my invention, if it is oil-soluble. Phenol aldehyde resins, such as resins sold under the trade names Krumbhaar #505 by Krumbhaar Chemicals, Inc., Kearney, New Jersey, Amberol F-77 a rosin modified phenol formaldehyde resin sold by Resinous Products Co., Philadelphia, and Beckacite 3000 also a phenol aldehyde resin sold by Reichhold Chemicals, Inc., Detroit, give very satisfactory results. However, as mentioned, every other oil-soluble resin may be used with equal satisfaction. Also natural resins which have been made oil-soluble by "running" are suitable for the method and the product of the present invention.

The oils applicable for the invention are drying as well as semi-drying and non-drying oils. Linseed oil, in its raw state, borated, blown or bodied, tung oil, raw or blown, castor oil raw or dehydrated, are just a few examples of the great number of oils which, taken singly or in combination, have proven applicable and advantageous for the process and product of this invention.

Gilsonite varnishes have a tendency to become colloidal. This disadvantage, however, may be easily overcome by using relatively high cooking temperatures in the production of the wrinkle finishes containing gilsonite. Cooking temperatures of from 550 to 650° F. have been found to produce the best results.

Another factor that has a bearing on the consistency of the finish is the solvent. It has been found that highly powerful solvents, particularly coal tar materials, such as toluol, xylol, alone or in admixture with petroleum solvents such as light gravity petroleum naphtha, counteract to a certain degree the tendency of the finishes to become colloidal.

Of the driers utilized with the wrinkle compositions of my invention, cobalt driers have proven most satisfactory. A manganese drier, however, can also be used. The driers sold under the trade names Nuodex Cobalt, 6% which is a cobalt naphthenate with a cobalt content of 6% and Nuolate Cobalt 4%, which is a cobalt lino-resinate having a cobalt content of 4%, have given excellent results.

Any process of finishing with the varnishes of my invention may be employed. For example, the composition may be applied to the surface of an article by spraying after which the article may be baked.

The temperatures and periods of time of baking are not critical for the varnishes of my invention. However, optimum results are obtained by baking for one hour at 300° F., for one and one-half hours at 250° F. or for two hours at 200° F.

The following examples serve to illustrate some varnishes of my invention made from hydrocarbon materials, namely gilsonite or pitch or a mixture of both.

Example I

| | | |
|---|---|---|
| Beckacite #3000 | lbs | 17 |
| Gilsonite | lbs | 33 |
| Raw tung oil | gals | 7½ |
| Xylol | gals | 2½ |
| Light gravity petroleum naphtha | gals | 12½ |
| Nuolate Cobalt, 4% | gals | ¼ |

The method used in preparing the varnish of Example I is the following: The gilsonite and Beckacite #3000 are melted in about 5 gals. of the raw tung oil and heated to approximately 600° F. and held at this temperature until a drop of the solution flows freely from the stirring rod. Heating is then discontinued and the batch allowed to cool down to about 500° F. whereupon the remaining 2½ gallons of the raw tung oil are added. After the varnish base thus formed has cooled to about 400° F., 2½ gallons of xylol are added and upon still further cooling to 300° F., 12½ gallons of light gravity petroleum naphtha and one quarter gallon of Nuolate Cobalt 4% are added. When this varnish was sprayed and baked for 1½ hours at 220° F., a hard film of good wrinkle texture of blackish brown color was obtained.

Example II

The same ingredients, proportions and steps were used as in Example I with the exception that instead of 17 lbs. Beckacite plus 33 lbs. gilsonite, 50 pounds of gilsonite were used. Again a hard film of fine and regular wrinkle texture was obtained; its color was practically black.

Example III

In this instance the gilsonite of Example II was replaced by 50 pounds of candle pitch. The film obtained again showed a fine and uniform wrinkle pattern and was hard; its color was that of a delicate yellow gold.

Example IV

This is similar to the preceding examples with the distinction that 25 pounds of gilsonite and 25 pounds of candle pitch were used. The film obtained was finely wrinkled and hard and of medium brown color.

Example V

| | | |
|---|---|---|
| Krumbhaar resin #505 | lbs | 24 |
| Gilsonite | lbs | 26 |
| Borated linseed oil | gals | 5 |
| Raw tung oil | gals | 5 |
| Xylol | gals | 2½ |
| Toluol | gals | 15 |
| Nuodex Cobalt, 6% | gals | ¼ |

The varnish was prepared in accordance with the directions given in Example I. Krumbhaar resin #505 is a modified phenol aldehyde resin. The borated linseed oil was produced from 16 gals. of heat bodied linseed oil (varnish grade), viscosity Z-4 as determined by the Gardner-Holdt standards, 2 gallons of raw linseed oil (varnish grade) and 6 pounds of manganese borate. On baking for two hours at 200° F. the film obtained with the varnish of Example V gave a brown wrinkle film with a fine texture.

Example VI

| | | |
|---|---|---|
| Amberol F-77 | lbs | 17 |
| Stearine pitch | lbs | 33 |
| Raw tung oil | gals | 7.5 |
| Xylol | gals | 2.5 |
| Light gravity petroleum naphtha | gals | 12.5 |
| Nuolate Cobalt, 4% | gals | 0.25 |

The procedure was the same as in the preceding examples. The resulting wrinkle texture was good and the film hard and of dark brown color.

Example VII

To eleven parts by volume of the mixture of Example VI, one part by volume of raw tung oil was added. The film obtained again showed a fine wrinkle texture but was slightly harder than that of Example VI.

Example VIII

| | | |
|---|---|---|
| Beckacite #3000 | lbs | 17 |
| Zeco #311 pitch | lbs | 33 |
| Raw tung oil | gals | 7½ |
| Xylol | gals | 2½ |
| Light gravity petroleum naphtha | gals | 12½ |
| Nuolate Cobalt, 4% | gals | ¼ |

Zeco #311 pitch is a hard candle pitch made by G. S. Ziegler & Co., New York. The varnish was cooked according to the details given in Example I, sprayed and baked at a temperature of approximately 290° F. for one hour. It yielded a hard, golden-colored film with a good wrinkle texture.

By the method of this invention colored varnishes are obtained without the necessity of a separate step for incorporating a pigment. Although the films obtained by my process are inherently colored, further additions of pigments may be made in order to change the color to a different shade. Thus, for example, by composing the finish from the relatively light candle pitch and adding specific pigments, films of red, green or other hues may be obtained.

The coating compositions of my invention may be applied to all kinds of materials such as metal, wood, cloth, rubber.

Having thus set forth my invention, I claim:

1. The process for producing a wrinkle finish coating composition which comprises melting 50 pounds of hydrocarbon material of the group consisting of gilsonite and candle pitch in untreated drying oil, heating the mixture to a temperature of from 550 to 650° F., cooling to approximately 500° F. and adding an additional quantity of said drying oil, so that the total amount thereof is between 7.5 and 10 gallons; cooling to 400° F. and adding part of the thinner, further cooling to 300° F. and adding the remaining part of the thinner and the drier.

2. The process for producing a wrinkle finish coating composition which comprises melting approximately 50 pounds of hydrocarbon material of the group consisting of gilsonite and candle pitch in five gallons of untreated drying oil, heating the mixture to a temperature of from 550 to 650° F., cooling to approximately 500° F., adding more of said drying oil so as to bring the total oil content to 7.5 to 10 gallons, cooling to approximately 400° F., adding substantially 2.5 gallons of thinner, further cooling to 300° F. and adding from 10-20 gallons of thinner and a drier.

3. The process for producing a wrinkle finish coating composition which comprises melting 50 pounds of hydrocarbon containing from 26-50 pounds of hydrocarbon material of the group consisting of gilsonite and candle pitch and 24–0 pounds of oil-soluble resin in five gallons of untreated drying oil, heating the mixture to a temperature of from 550 to 650° F., cooling to approximately 500° F., adding more of said drying oil so as to bring the total oil content to 7.5 to 10 gallons, cooling to approximately 400° F., adding substantially 2.5 gallons of thinner, then further cooling to 300° F. and adding from ten to twenty gallons of thinner and a drier.

4. A wrinkle coating composition having the properties of a product obtained according to the process of claim 1.

5. A wrinkle coating composition having the properties of a product obtained according to the process of claim 2.

6. A wrinkle coating composition having the properties of a product obtained according to the process of claim 3.

7. A wrinkle finish composition comprising the heat reaction product of 50 pounds of a solid base material with 7.5 to 10 gallons of untreated drying oil at a temperature of from 500 to 650° F., metallic drier and thinner, 52 to 100% of said solid base material consisting of a hydrocarbon selected from the group consisting of untreated gilsonite and untreated candle pitch and the remainder of oil-soluble resin.

8. A wrinkle finish composition comprising the heat reaction product of 50 pounds of a solid base material with 7.5 to 10 gallons of untreated drying oil at a temperature of from 500 to 650° F., metallic drier and thinner, 52 to 100% of said solid base material consisting of untreated gilsonite and the remainder of oil-soluble resin.

9. A wrinkle finish composition comprising the heat reaction product of 50 pounds of a solid base material with 7.5 to 10 gallons of untreated drying oil at a temperature of from 500 to 650° F., metallic drier and thinner, 52 to 100% of said solid base material consisting of untreated candle pitch and the remainder of oil-soluble resin.

10. A wrinkle finish composition comprising the heat reaction product of 50 pounds of a solid base material with 7.5 to 10 gallons of untreated drying oil at a temperature of from 500 to 650° F., metallic drier and thinner, 52 to 100% of said solid base material consisting of a mixture of untreated gilsonite and untreated candle pitch and the remainder of oil-soluble resin.

11. A wrinkle finish composition comprising the heat reaction product of 50 pounds of a solid base material with 7.5 to 10 gallons of untreated drying oil at a temperature of from 500 to 650° F., metallic drier and a mixture of xylol and toluol, 52 to 100% of said solid base material consisting of a hydrocarbon selected from the group consisting of untreated gilsonite and untreated candle pitch and the remainder of oil-soluble resin.

12. A wrinkle finish composition comprising the heat reaction product of 50 pounds of a solid base material with 7.5 to 10 gallons of untreated drying oil at a temperature of from 500 to 650° F., metallic drier and a mixture of xylol and light petroleum naphtha, 52 to 100% of said solid base material consisting of a hydrocarbon selected from the group consisting of untreated gilsonite and untreated candle pitch and the remainder of oil-soluble resin.

13. A wrinkle finish composition comprising the heat reaction product of 50 pounds of a solid base material with 7.5 to 10 gallons of untreated drying oil at a temperature of from 500 to 650° F., metallic drier, thinner, and pigment, 52 to 100% of said solid base material consisting of a hydrocarbon selected from the group consisting of untreated gilsonite and untreated candle pitch and the remainder of oil-soluble resin.

14. A wrinkle finish composition comprising the heat reaction product of approximately 50 pounds of a solid base material with 7.5 to 10 gallons of untreated drying oil at a temperature of from 500 to 650° F., metallic drier and thinner, 52 to 100% of said solid base material consisting of a hydrocarbon selected from the group consisting of untreated gilsonite and untreated candle pitch and the remainder of oil-soluble resin.

WILLIAM ALLSHIRE WALDIE.

REFERENCES CITED

The following references are of record in the file of this patent:

UNITED STATES PATENTS

| Number | Name | Date |
| --- | --- | --- |
| 2,090,623 | Damitz | Aug. 24, 1937 |
| 2,069,314 | Hunt et al. | Feb. 2, 1937 |
| 2,065,881 | Alvarado | Dec. 29, 1936 |
| 2,063,669 | Ford | Dec. 8, 1936 |
| 1,950,417 | Root | Mar. 13, 1934 |
| 1,726,473 | Davey | Aug. 27, 1929 |
| 1,627,069 | Wade | May 3, 1927 |

OTHER REFERENCES

Asphalts and Allied Substances, Abraham, vol. 1, fifth edition, pages 251, 252, 421, and 435.